July 22, 1958     J. RABINOW     2,844,760

HEADLIGHT DIMMER COMBINED WITH AUTOMOBILE LIGHT

Filed April 29, 1955

INVENTOR.
Jacob Rabinow
BY
*Max L. Libman*
Attorney

United States Patent Office 2,844,760
Patented July 22, 1958

2,844,760

HEADLIGHT DIMMER COMBINED WITH AUTOMOBILE LIGHT

Jacob Rabinow, Takoma Park, Md.

Application April 29, 1955, Serial No. 504,983

5 Claims. (Cl. 315—83)

This invention relates to the field of automatic controls for the bright lights of an automobile, generally known as headlight dimmers. More specifically, it relates to a device which combines in one housing the function of an automatic headlight dimmer and lights other than the bright beams which the headlight dimmer controls.

As is well-known, the question of cost is of paramount importance in devices which have to be installed on present-day automobiles. Any expedient which can reduce the cost, the size, and the complexity of the device used in an automobile is highly desirable. My invention is based on the fact that all present-day cars manufactured in the United States, and generally speaking, elsewhere, have two sets of lights at front. One set consists of two or more powerful headlights, each provided generally with two filaments so as to emit an "up" and a "down" beam. There are also two "parking" lights in each automobile which are employed when the bright headlights are shut off and are generally used when a car is standing still and for the purposes other than the illumination of the road ahead of the car.

One of the problems that has arisen in the development of headlight dimmers is that of providing the necessary space and location in the automobile and doing so at a minimum of cost. The present models of such dimmers are generally mounted as separate units behind the windshield. For reasons of economy and appearance, it would be highly desirable to conceal the dimmer mechanism within the normal outlines of the automobile body. This approach, however, would require a special opening to be provided which would have to be covered or camouflaged when no dimmer were used. It is the object of my invention to combine my dimmer lens or front opening with that necessary for one of the parking lights so that a compact and economical arrangement would result and no change in the car's appearance would occur upon the installation of a headlight dimmer. Since a headlight dimmer is not employed when the parking lights are on, it is very efficient to employ a single housing which contains both the dimmer sensing element, or for that matter the entire dimmer mechanism, and one of the parking bulbs. Turn indicator lights can also be incorporated with the headlight dimmer either by proper internal light shielding or by arranging suitable circuitry as will be described below.

Figure 1:
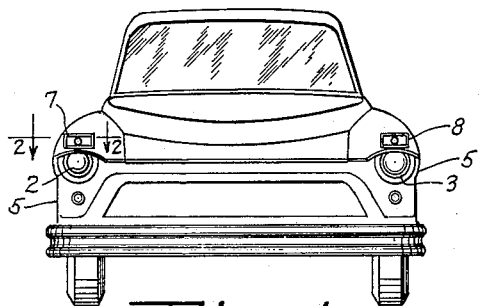
Fig. 1 shows the arrangement of the fenders of an automobile with the parking light mounted above the bright headlight.

Referring to Fig. 1, it is, of course, customary in modern cars to mount the headlights 2, 3, flush into the fenders 4, 5. It is also customary to provide parking lights 7, 8, which are usually mounted below the headlights, although in some models the parking lights have been mounted on the top of the fenders in a streamlined housing. Some models of cars have a single front unit which mounts both the parking lights and the headlights. In most modern cars, it is customary to also use the parking lights as the front turn indicators by blinking or flashing one side or the other to indicate a turn, although some cars have separate turn indicators. However, for my purpose, I prefer to mount the parking lights above the headlight as shown in Fig. 1, and to use the housing of left side parking light 8 to also house an automatic headlight dimmer, while the front lens of the housing serves both for the parking light and for the headlight dimmer.

Figure 2A:
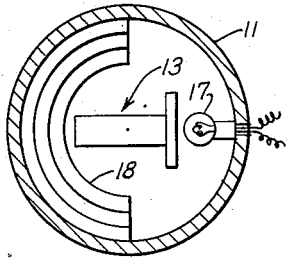
Fig. 2a is a sectional view taken on line 2a—2a of Fig. 2.
Figure 2:
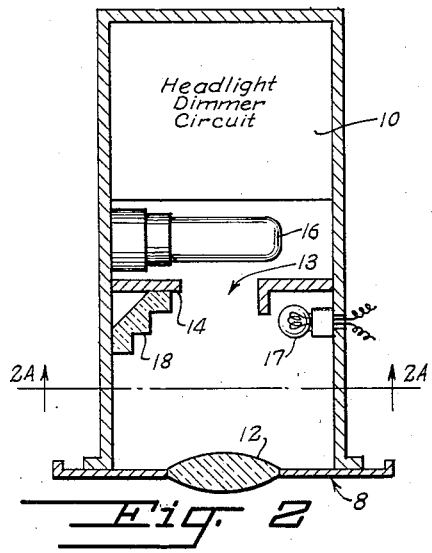
Fig. 2 shows a cross-section view taken on line 2—2 of Fig. 1, of a headlight dimmer mounted within the fender showing the arrangement of the lens, the photocell, and the parking light bulb.

Fig. 2 shows a typical cross-section of parking light housing 11 according to the invention. Since only a relatively weak light is needed for parking or turn indicating, and this can be furnished by a very small bulb 9, there is plenty of room in the housing 11 to enclose any desired type of headlight dimmer 10 in the rear of the housing. Lens 12 is common to both the parking light and the headlight dimmer. Light from the field of view ahead of the vehicle is focussed or concentrated through aperture 13 in partition 14 on to the photomultiplier tube 16 or other photosensitive device used to actuate the automatic dimmer. The present invention may be used with any type of dimmer, although I prefer to use the scanning type of dimmer as shown in my U. S. Patent No. 2,632,040, for Automatic Headlight Dimmer, of March 17, 1953.

Figure 3:
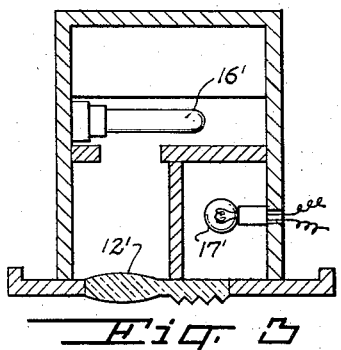
Fig. 3 shows another possible arrangement where the parking light bulb is optically shielded from the headlight dimmer so that the same bulb may be used for a turn indicator while the bright headlights are energized.

The parking light bulb 17 is preferably mounted so that no light from the bulb shines directly into the aperture 13. This is not important if the parking light is not also used as a turn indicator, since where a separate turn indicator is provided, the parking light is never turned on when the headlight dimmer is in use. However, where the parking light is used as a turn indicator, it may begin to flash a turn signal while the headlights are turned on, and if the headlight beam is up at that time, it will oscillate down and up as the turn indicator flashes. This apparent objection is actually not serious, because if there is an oncoming car in the field of view, the headlights will be dimmed in any case, and no beam oscillation will occur, while if there is no oncoming car, no harm will be done by the beam blinking up and down a few times until the turn is completed. However, this can in any case be minimized by placing the bulb 17 as shown in Fig. 2 and coating the interior of the front part of casing 11 with dark paint to reduce internal reflections while a forwardly-directed reflector 18 of arcuate stepped shape as shown in Figs. 2 and 3 is provided to intensify the light from lamp 17 for parking and turn indicating purposes. In this way, not enough light from the lamp 17 enters aperture 13 to disturb the operation of the headlight dimmer, especially if a scanning type dimmer as described in my prior patent is used, which is not very sensitive to ambient light level but only to intense bright spots such as are provided by the headlights of an oncoming car.

It will become obvious that the general arrangement shown in the above figures is such that if a headlight dimmer is not employed in the automobile, the latter may be provided with the parking light and turn indicator with no changes in the external appearance. The other great advantage of this unitary assembly is that the cost of the headlight dimmer is greatly reduced because it can be built as a single package completely hidden in the fender of the automobile and not built as two separate units as is common practice in today's automobiles. This saves the cost of a separate ornamental housing for the sensing unit and the cost of associated cabling and terminals. Greater reliability and ruggedness are also possible in a single package dimmer. The location of the entire dimmer near the headlights makes for simple and short wiring and for simplified installation. Also there is plenty of room under the fender of modern cars for all of the circuitry and equipment of the headlight dimmer.

Figure 4:
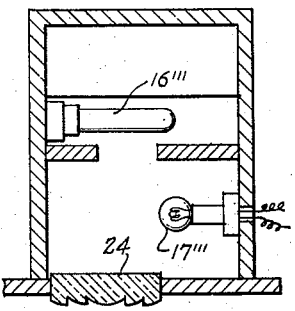
Fig. 4 is a sectional view of a modification using a Fresnel lens instead of an ordinary convex lens.

While an ordinary double-convex lens is shown in Fig. 2 as the lens for the headlight dimmer, a Fresnel lens may be employed as shown at 24 in Fig. 4. The choice of one or the other depends on the type of dimmer being used and in the scanning type of dimmer, such as described in my Patent No. 2,632,040, I prefer to use a double-convex lens. In many of the present-day dimmers of the non-scanning type, the Fresnel lens may be preferred because of lower cost. The scanning type is preferred when close to the headlights because of its low sensitivity to ambient light level.

Fig. 2 shows the parking light bulb directly in the same chamber with the photocell of the headlight dimmer. This does not cause any trouble because in almost all of the systems of which I am aware today the headlight is so connected that the dimmer is energized only when the bright headlights are on. This means that when the parking light is turned on, the headlight dimmer is off and therefore is not affected by the light in the housing.

Figure 5:
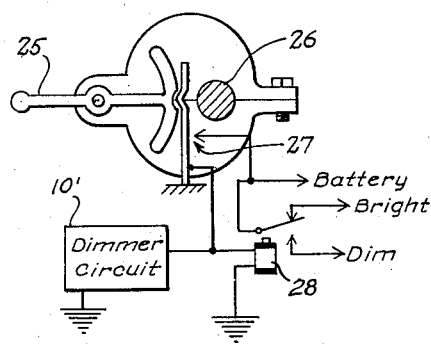
Fig. 5 is a schematic diagram of a circuit for dimming the headlight whenever the turn indicator is flashing.

Since in most modern cars the parking light is also used as a turn indicator, there may be a desire to flash the parking light while the headlights are also energized. This could lead to some undesirable results by causing the headlights to flash in synchronism with the turn indicator, especially if a scanning type dimmer is not used. I show two other possible methods of overcoming this difficulty. In Fig. 3, as stated previously, the parking light is set behind a light baffle plate so that its light does not reach he headlight dimmer. Another solution which may be employed is to disable the headlight dimmer when the turn signal is energized. It will be preferable to disable the dimmer in such a way that the headlights go to the downward position when a turn is being signaled. Fig. 5 shows a possible circuit for doing this. Connected to the turn indicating arm 25 is an additional switch that operates the light control relay independently of the condition of the headlight dimmer. The turn indicating control arm 25 is shown mounted on the steering post column 26 as is customary. In the neutral position of the arm shown in Fig. 5, switch 27 is open and the automatic headlight dimmer 10' operates normally, but in the actuated position of the turn indicator arm (either up or down from the position shown) switch 21 is closed which causes the dimmer relay 28 to operate regardless of the automatic dimmer condition, to dim the headlights during the time that the turn light is flashing.

Figure 6:
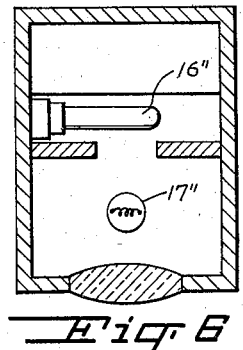
Fig. 6 is a schematic sectional view of a modification using a parking light directly in line with the dimmer optical system.

Fig. 6 shows a more compact embodiment of my invention where the parking bulb 17" is actually located in the optical path of the headlight dimmer. The small areas of the filament and of its supporting wires do not interfere seriously with the formation of the image of the field of the field of view by the lens and can be neglected. This construction would be of particular advantage where the dimmer-parking light combination must be of a minimum size. Other methods of combining a headlight dimmer with lights of the automobile will, of course, be obvious to one skilled in the art.

Figure 7:
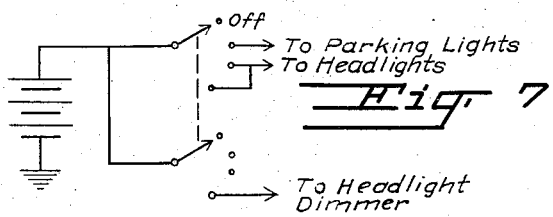
Fig. 7 is a schematic circuit diagram for dashboard switch control of the dimming, headlights and parking lights.

Fig. 7 shows the preferred manner in which the dashboard light control switch should be wired for use with an automatic headlight dimmer as shown in the preceding figures. As Fig. 7 is self-explanatory, it will not be described in detail. It will be apparent that when the parking lights are actuated, the headlights are off, and vice versa, so no interference can exist. A switch setting should also be provided, as shown, for normal headlight operation without the automatic dimmer, which is for use in city driving and similar conditions where automatic dimming is not required.

It should be noted that there is a particular reason for mounting the parking lights above the headlights in the present invention, and that is because it is desirable to have the lens of the automatic dimmer mounted as high as possible so that its field of view will be comparable with that of the driver, otherwise the driver can sometimes see the headlights of an oncoming car over a gentle hill for some time before the dimmer sees them. Th automatic dimmer should be mounted on the driver's left side, of course, so that when closely following another vehicle, the dimmer will not be blocked by the vehicle, but will see oncoming lights at least as soon as the driver sees them.

It will be apparent that the embodiments shown are only exemplary and that various modifications can be made in construction and arrangement within the scope of my invention as defined in the appended claims.

I claim:

1. In an automobile headlight dimmer, a unitary structure combining an automatic headlight dimmer and a signal light, said structure having a single means for gathering the light for actuation of the headlight dimmer and for the transmission of the light from the signal light, and switch circuit means arranged to disable said dimmer whenever the light source is energized.

2. In an automotive vehicle having headlights, a housing mounted on said vehicle, a forwardly-mounted lens in said housing for gathering light from a field of view ahead of the vehicle, automatic headlight dimmer means in said housing including a photosensitive element responsive to said light for dimming the vehicle headlights, and a signal lamp mounted rearwardly of said lens in said housing for transmitting light through said lens toward said field of view.

3. The invention according to claim 2, a manually operable turn indicator switch for energizing said signal lamp when said switch is moved manually in one direction from a neutral position, and an overriding dimmer switch controlled by said manual switch for dimming the vehicle headlights in the so-moved position of said manual switch, said overriding dimmer switch being inactive in the neutral position of said manual switch.

4. The invention according to claim 2, and opaque partition means in said housing for blocking direct passage of light from said lamp to said photosensitive element.

5. The invention according to claim 4, said partition means extending completely from said lamp to a portion of said lens.

References Cited in the file of this patent

UNITED STATES PATENTS

| | | |
|---|---|---|
| 2,558,969 | Le Croy | July 3, 1951 |
| 2,632,040 | Rabinow | Mar. 17, 1953 |
| 2,730,654 | Rabinow | Jan. 10, 1956 |
| 2,732,539 | Andresen | Jan. 24, 1956 |